United States Patent [19]

Beuter et al.

[11] Patent Number: 4,769,794

[45] Date of Patent: Sep. 6, 1988

[54] BIRD-SCARING METHOD AND DEVICE

[75] Inventors: Karl Beuter, Frankfurt am Main; Rainer Weiss, Hattersheim, both of Fed. Rep. of Germany

[73] Assignee: Battelle Institut E.V., Frankfurt, Fed. Rep. of Germany

[21] Appl. No.: 912,241

[22] PCT Filed: Jan. 11, 1986

[86] PCT No.: PCT/EP86/00009

§ 371 Date: Oct. 7, 1986

§ 102(e) Date: Oct. 7, 1986

[87] PCT Pub. No.: WO86/04485

PCT Pub. Date: Aug. 14, 1986

[30] Foreign Application Priority Data

Feb. 8, 1985 [DE] Fed. Rep. of Germany ....... 3504272

[51] Int. Cl.$^4$ .............................................. H04B 1/02
[52] U.S. Cl. .................................................... 367/139
[58] Field of Search .................... 367/139; 340/384 E; 116/22 A; 43/124

[56] References Cited

U.S. PATENT DOCUMENTS

| 3,683,113 | 8/1972 | Stewart | 340/384 E |
| 4,105,992 | 8/1978 | Luciano | 340/15 |
| 4,219,884 | 8/1980 | DeSantis | 367/139 |
| 4,284,845 | 8/1981 | Belcher | 179/1 |

FOREIGN PATENT DOCUMENTS

| 2706298 | 9/1977 | Fed. Rep. of Germany ...... 367/139 |
| 2479652 | 10/1981 | France ...................... 340/384 E |
| WO85/02319 | 6/1984 | PCT Int'l Appl. . |
| 1228405 | 4/1971 | United Kingdom . |

Primary Examiner—Thomas H. Tarcza
Assistant Examiner—Ian J. Lobo
Attorney, Agent, or Firm—Fisher, Christen & Sabol

[57] ABSTRACT

For scaring birds, at least two acoustic signals are generated whose frequencies are periodically modulated within a range between about 30 and 9000 Hz, the modulation period ranging between about 0.01 and about 5 seconds. The signals differ in the frequency modulation range, in the modulation period and/or in duration. The signals are emitted either in fixed or in arbitrary sequence.

14 Claims, 4 Drawing Sheets

BIRD-SCARING METHOD AND DEVICE

DESCRIPTION

The invention relates to a method and a device for scaring birds by discontinuous emission of acoustic, frequency-modulated signals of limited duration.

An electronic device for simulating scaring, warning or mating calls of animals is known from the German Patent No. 12 60 855. According to this patent, the animal sounds are synthetically generated from the frequency spectrum of pulse-controlled audio generators. The frequency of repetition of these animal sounds is controlled by clock pulses. By electronic conception of the device, it is possible to program various animal sounds, so that habituation of the animals to the very same sounds is prevented. In addition, a method of scaring rats and mice is described in the German Patent Application (OS) No. 20 22 056. In this case, the place where the animals stay is irradiated with ultrasonic sound of a specific level, which is periodically frequency-modulated within a given ultrasonic frerquency range. None of the conventional methods, however, is suitable for the protection of farming areas, such as fruit plantations and cornfields, of fishfarming ponds or of waste dumps, for the purpose of scaring birds, in particular starlets, gulls and common herons. The birds get used to the conventionally frequency- and/or amplitude-modulated acoustic signals in the range of audibility within a relatively short period of time, so that effective application of such devices is no longer ensured. The devices generating ultrasonic signals do not have a permanent birdscaring effect.

The object of the present invention therefore is to develop a method which permits effective bird scaring for indefinitely long periods of time. The bird-scaring device to be implemented should operate off the line and be characterized by lower power consumption and simple and low-cost design. In addition, the device should be adaptable to various species of birds.

According to the invention, this object is reached by generating at least two signals whose frequencies are periodically modulated within a range from about 30 to 9000 Hz, the modulation period being between about 0.01 and 5 seconds, said two signals differing in the frequency modulation range, in the modulation period and/or in duration, the individual signals being emitted either in fixed or in arbitrary sequence. Advantageous embodiments of the method according to the invention are defined in Subclaims 2 to 7.

The bird-scaring device according to the invention is provided with a sequencing control which permits the duration and/or the sequence of signals to be emitted to be determined and which controls a signal generation unit with frequency modulation equipment. The Subclaims 9 to 12 describe preferred embodiments of the device according to the invention.

It was found that audible acoustic signals which are frequency-modulated in a known manner are not suitable for scaring birds, even if these are emitted as a sequence of differently modulated signals. The birds get used to these sounds or to the sequence of their emission within a relatively short period of time, so that a scaring effect can no longer be achieved. The method according to the invention, on the other hand, generates signals which are modulated within a specific frequency range and which show a specific modulation period. It appeared that, surprisingly, neither a fixed nor an arbitrary emission sequence of such signals leads to habituation. An essential feature is that more than two, e.g. 16 to 32 of such signals are generated, which differ in three of their parameters, i.e. in frequency modulation range, in modulation period and/or in duration. This permits a plurality of variations. In addition, it is possible arbitrarily to vary the interval between two successive signals. According to the invention, the interval between the individual signals can be between 20 seconds and 1 hour, preferably between 1 and 30 minutes, in particular between 5 and 20 minutes. Each of the signals should be frequency-modulated preferably between 100 and 7000 Hz, in particular between 150 and 5000 Hz. The modulation period ranges between about 0.01 and 5 seconds, preferably between 0.02 and 2 seconds, in particular between 0.05 and 1 second. Particularly favorable results are obtained if the range in which frequency modulation occurs covers at least 2000 Hz. The lower limit of the frequency modulation range should preferably be, however, between 1000 and 100 Hz, in particular between 500 and 100 Hz. The duration of each individual signal is between 1 and 30 seconds, preferably between 10 and 20 seconds. Due to the measure according to the invention, a sound pressure level of about 60 dB at the place of sound immision is sufficient. This permits continuous operation of the device according to the invention, without any acoustic nuisance to adjacent residents.

The conception of the device for carrying out such a method according to the invention fulfils the requirements of the special type of application. It operates off the line and has a low power consumption. It can be triggered either automatically or manually, has a simple circuitry and can be implemented at low cost.

The invention is described in detail by the following description and the schematic drawings.

FIG. 1 depicts the overall concept of the device according to the invention, which consists essentially of four units: sequencing control, signal generation, power supply and reproduction units.

Figure 1:
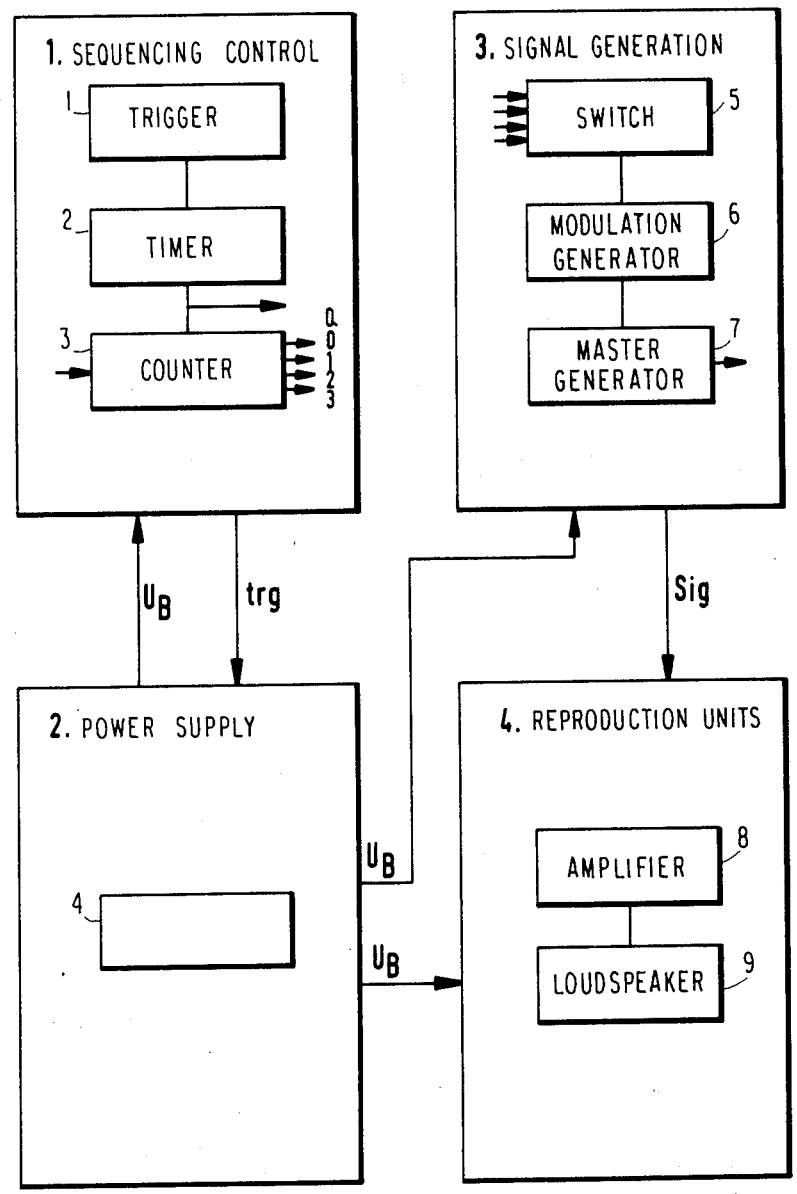
FIG. 1 shows the overall conception of an embodiment of the device according to the invention.

The sequencing control may consist of the trigger 1, the timer 2 and the counter 3. It can, however, also be implemented by a microprocessor. This control unit is connected with the supply unit with an accumulator 4. The signal generation unit consists essentially of the analogue multiplex switch 5, the modulation generator 6 and the master generator 7. Reproduction is ensured by a power amplifier 8 and a loudspeaker 9.

Figure 2:
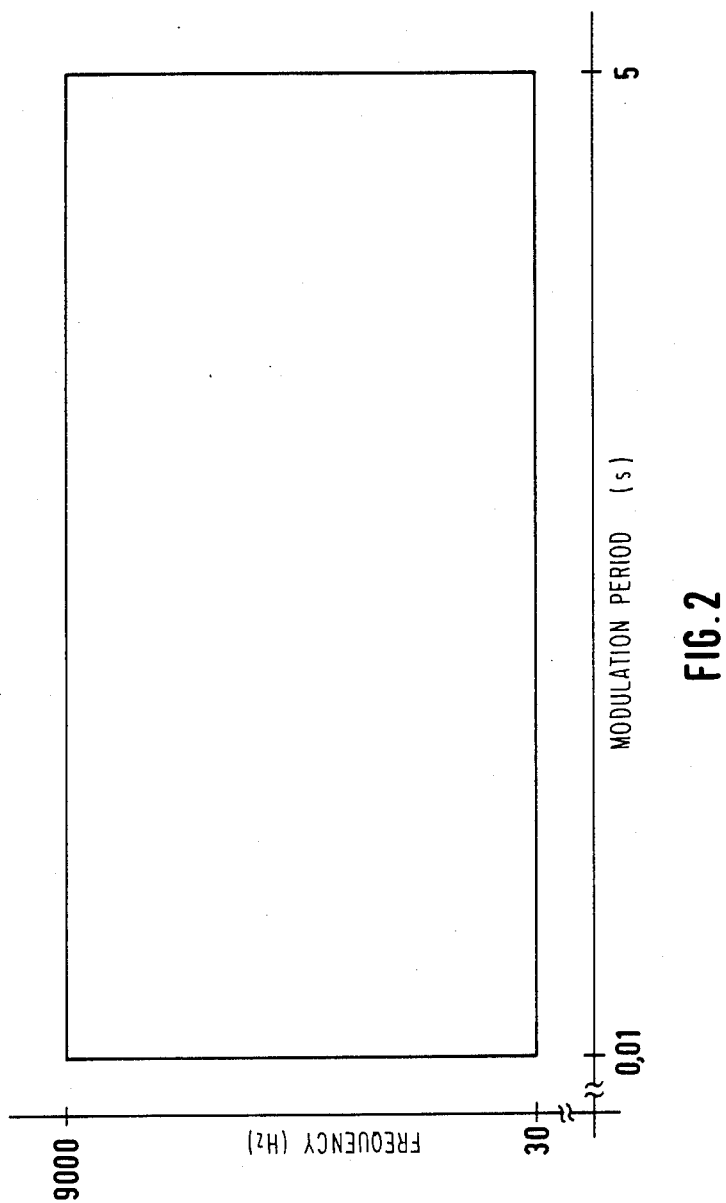
FIG. 2 shows the frequency range modulated according to the invention, and the modulation period.

According to the invention, the emitted signal is modulated within a specific frequency range and with a specific period, as is shown in FIG. 2. The modulated frequency range used for bird scaring is between 30 and 9000 Hz at a modulation period of, e.g., 0.01 to 5 seconds. As outlined in the foregoing, the signal can have an arbitrary value within this range, provided that the above conditions are satisfied.

Figure 3:
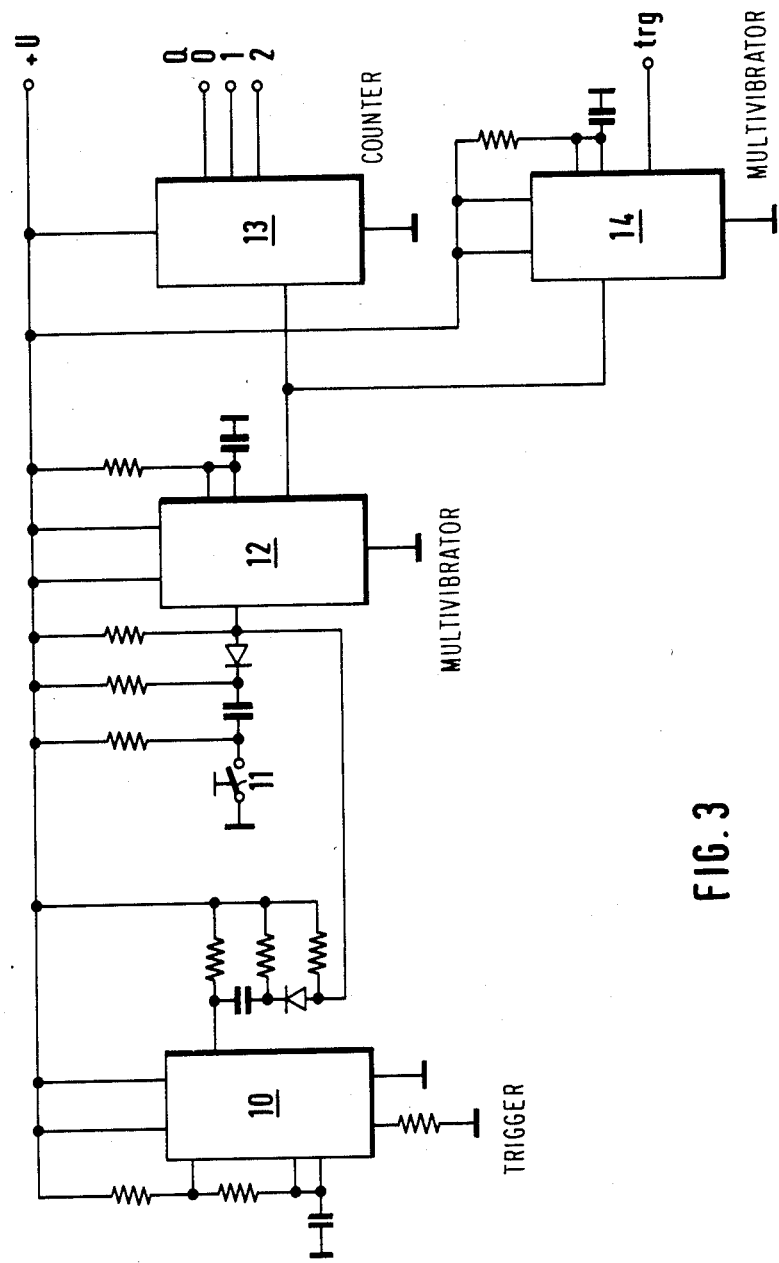
FIG. 3 shows an embodiment of the sequencing control implemented according to the circuitry.

As shown in FIG. 3, the sequencing control according to the invention consists essentially of an automatic trigger and/or a manual trigger. The trigger 10 in multivibrator circuit generates, e.g., one trigger signal every 10 minutes. This trigger starts a monostable multivibrator 12. The negative slope of the pulse generated by the monostable multivibrator 12 advances the counter 13 by one bit and simultaneously triggers a further monostable multivibrator 14. This multivibrator switches on the supply voltage for signal generation and reproduction via a relay which is not shown here for a specific, variable duration, e.g. 10 seconds. According to this example this procedure is repeated every 10 minutes, provided that the manual trigger 11 is not actuated in between. In this embodiment the counter 13 is implemented for 8 signals, which are generated each time when the supply voltage is advanced by 1 bit.

Depending on the position of the counter 13, the respective frequency-determining resistor 16 is connected to the modulation generator 17, e.g. via an 8-channel analogue multiplex switch 15, whereby the respective modulation frequency is set. The modulation frequency can thus be automatically varied in a fixed sequence. The modulation factor and the frequency of the master generator 18 are determined by connecting the generator modules 17 and 18. Subsequently, the generator signal is amplified and emitted by a loudspeaker.

For variable signal sequence, the timer 12 in FIG. 3 is operated as a monostable multivibrator with adjustable pulse duration. Triggering can be effected by a low-pass-filtered and amplified signal of an astable multivibrator that is not shown in this figure.

Figure 4:
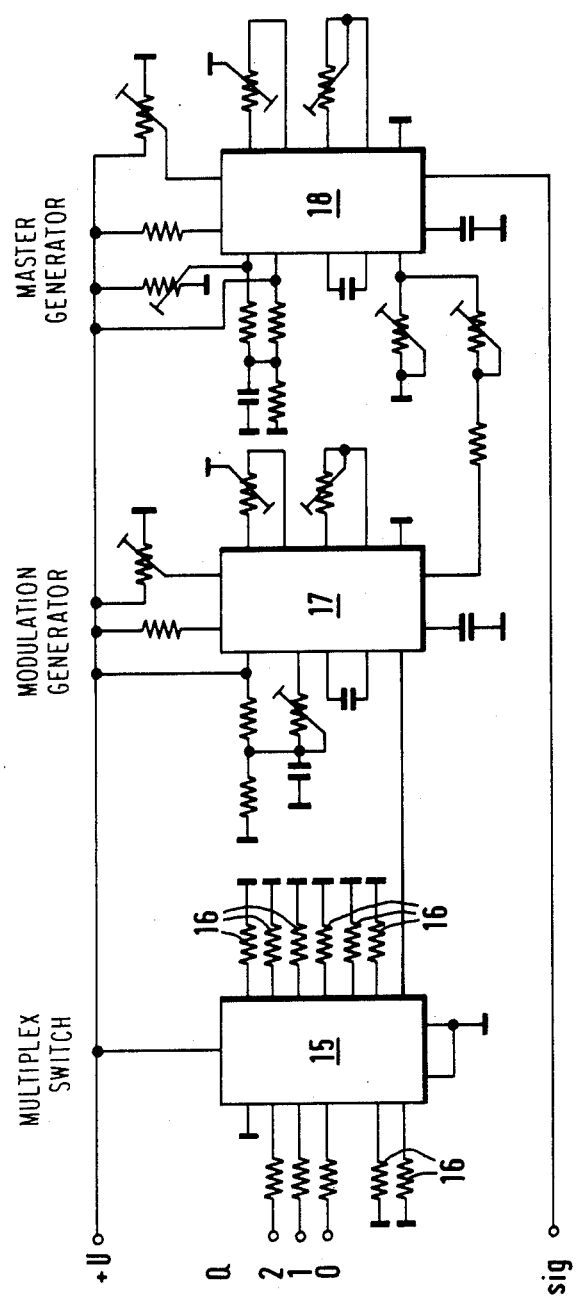
FIG. 4 shows an embodiment of the signal generation implemented according to the circuitry.

The counter 13, which operates at a given clock frequency is started and stopped by the pulse of the timer 12. The 8-channel analogue multipley switch 15 in FIG. 4 sets the respective frequency-determining resistor 16. It is thus possible to adjust the modulation frequency automatically without a fixed sequence.

Instead of the analogue multiplex switch 15 and of the modulation generator 17, it is possible to use a memory in which all the modulation types or frequencies are filed. In this case the sequencing control must be provided with respective modules which permit readout of the memory contents.

We claim:

1. A method of scaring birds by the discontinuous emission of frequency-modulated emitted signals of limited duration comprising: producing said emitted signals by generating at least two separate signals whose frequencies are periodically modulated within a range between about 30 and about 9000 Hz, the modulation period of each signal being between about 0.01 and about 5 seconds, and each of said at least two separate signals differing in the frequency modulation range, in the modulation period and/or in duration, and the emitted signals being broadcast either in fixed or in arbitrary sequence.

2. A as claimed in claim 1, wherein the frequency of each of said at least two separate signals is modulated within a range between 100 and 7000 Hz, preferably between 150 and 5000 Hz.

3. A method as claimed in claim 1 or claim 2, wherein the modulation period is between 0.02 and 2 seconds, preferably between 0.05 and 1 second.

4. A method as claimed in any of the claims 1 to 3, wherein the modulation range between the lower and the upper frequency covers at least 2000 Hz.

5. A method as claimed in any of the claims 1 to 4, wherein the lower limit of the frequency modulation range is between 1000 and 100 Hz, preferably between 500 and 100 Hz.

6. A as claimed in any of the claims 1 to 5, wherein the duration of each of said at least two separate signals is between 1 and 30 seconds, preferably between 10 and 15 seconds.

7. A method as claimed in any of the claims 1 to 6, wherein the interval between two successive emitted signals is between 20 seconds and 1 hour, preferably between 1 and 30 minutes, in particular between 10 and 20 minutes.

8. Bird-scaring device having a means for the simultaneous generation of at least two acoustic frequency modulated signals of limited duration comprising means to generate at least two signals having differing frequencies, a sequencing control (1, 2, 3 and 10, 12 and 13) by means of which the duration and/or the sequence of signals to be emitted can be set, and a signal generation unit with frequency modulation devices (6, 7 and 17, 18) to periodically change the frequency modulation within a range of 30 to 9000 Hz and the modulation period within a range of 0.01 and 5 seconds, the foregoing sequencing control (10, 12, 13) being comprised of an automatic trigger (10) which, after a period of time, a trigger signal can be generated to start timer (12) to thereby turn on the supply voltage for signal generation and reproduction, and the timer being connected to counter (13) which in combination with an analogue multiplex switch (15), sets the corresponding frequency.

9. Device as claimed in claim 8, wherein the counter (13) can be advanced in steps of 1 bit each by the negative or positive slope of the pulse generated by the timer (12) and wherein, depending on the position of the counter (13), the respective resistor (16) can be switched on for fixing the modulation frequency.

10. Device as claimed in any of the claim 9, wherein, in order to generate scaring signals of arbitrary sequence, the counter (13) runs at the frequency of a clock and stops when the timer (12) is switched off.

11. Device as claimed in claim 10, wherein the interval between two successive signals can be fixed by the sequencing control.

12. Device as claimed in claim 8, wherein the interval between two successive signals can be fixed by the sequencing control.

13. Device as claimed in claim 8, wherein the interval between two successive signals can be fixed by the sequencing control.

14. Device as claimed in claim 9, wherein the interval between two successive signals can be fixed by a sequencing control.

* * * * *